United States Patent
Lipowicz et al.

(10) Patent No.: US 12,453,375 B2
(45) Date of Patent: Oct. 28, 2025

(54) THREE-PIECE ELECTRONIC VAPING DEVICE WITH PLANAR HEATER

(71) Applicant: Altria Client Services LLC, Richmond, VA (US)

(72) Inventors: Peter J. Lipowicz, Midlothian, VA (US); Srinivasan Janardhan, Glen Allen, VA (US); Travis Garthaffner, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 1016 days.

(21) Appl. No.: 17/395,079

(22) Filed: Aug. 5, 2021

(65) Prior Publication Data

US 2021/0360971 A1    Nov. 25, 2021

Related U.S. Application Data

(63) Continuation of application No. 15/457,917, filed on Mar. 13, 2017, now Pat. No. 11,129,413.

(51) Int. Cl.
  *A24F 40/42* (2020.01)
  *A24F 40/44* (2020.01)
  (Continued)

(52) U.S. Cl.
  CPC .............. *A24F 40/42* (2020.01); *A24F 40/44* (2020.01); *A24F 40/46* (2020.01); *B08B 7/0071* (2013.01);
  (Continued)

(58) Field of Classification Search
  CPC ............ H05B 2203/021; H05B 1/0244; H05B 3/0014; H05B 3/16; H05B 1/0297;
  (Continued)

(56) References Cited

U.S. PATENT DOCUMENTS

| | | |
|---|---|---|
| 5,573,692 A | 11/1996 | Das et al. |
| 5,878,752 A | 3/1999 | Adams et al. |

(Continued)

FOREIGN PATENT DOCUMENTS

| | | |
|---|---|---|
| CA | 2778903 A1 | 5/2011 |
| CN | 203327950 U | 12/2013 |

(Continued)

OTHER PUBLICATIONS

Russian Notice of Allowance dated Nov. 12, 2021 for corresponding Russian Application No. 2019130993, and English-language translation thereof.

(Continued)

*Primary Examiner* — Chris Q Liu

(74) *Attorney, Agent, or Firm* — Harness, Dickey & Pierce, P.L.C.

(57) ABSTRACT

An electronic vaping device includes a power supply section, a heater assembly section, and a cartridge. The power supply section includes a power supply. The cartridge section includes a reservoir configured to store a pre-vapor formulation, and a wick in fluid communication with the pre-vapor formulation. The heater assembly section is connected to the power supply section and the cartridge. The heater assembly section includes at least one plate heater in physical contact with a portion of the wick. The at least one plate heater is selectively electrically connectable to the power supply.

10 Claims, 12 Drawing Sheets

(51) Int. Cl.
  *A24F 40/46* (2020.01)
  *B08B 7/00* (2006.01)
  *H05B 1/02* (2006.01)
  *A24F 40/10* (2020.01)

(52) U.S. Cl.
  CPC ............ *H05B 1/0244* (2013.01); *A24F 40/10* (2020.01); *H05B 2203/021* (2013.01)

(58) Field of Classification Search
  CPC ........ H05B 2203/013; H05B 2203/022; H05B 3/10; H05B 3/12; H05B 3/141; H05B 3/34; H05B 3/42; H05B 3/44; H05B 6/108; H05B 1/02; H05B 1/0227; H05B 1/0291; H05B 2203/014; H05B 2203/015; H05B 2203/017; H05B 3/0004; H05B 3/0019; H05B 3/06; H05B 3/145; H05B 3/24; H05B 3/26; H05B 3/347; H05B 3/78; A24F 40/10; A24F 40/46; A24F 40/42; A24F 40/20; A24F 40/40; A24F 40/485; A24F 40/50; A24F 40/44; A24F 40/60; A24F 40/70; A24F 40/465; A24F 40/48; A24F 40/85; A24F 40/90; A24F 3/02; A24F 40/51; A24F 40/53; A24F 40/57; A24F 40/65; A24F 40/95; A24F 1/00; A24F 40/00; A24F 40/05; A24F 42/00; A24F 42/10; A24F 7/00; A24F 7/04; A24F 9/04
  USPC .... 131/329, 194, 273, 328, 360, 184.1, 347, 131/359, 361; 219/482, 535, 536, 543, 219/553
  See application file for complete search history.

(56) References Cited

U.S. PATENT DOCUMENTS

| | | | |
|---|---|---|---|
| 6,688,313 | B2 | 2/2004 | Wrenn et al. |
| 7,167,641 | B2 | 1/2007 | Tam et al. |
| 7,832,410 | B2 | 11/2010 | Hon |
| 9,084,440 | B2 | 7/2015 | Zuber et al. |
| 9,282,772 | B2 | 3/2016 | Tucker et al. |
| 9,289,014 | B2 | 3/2016 | Tucker et al. |
| 2012/0025692 | A1 | 2/2012 | Ma |
| 2013/0298905 | A1 | 11/2013 | Levin et al. |
| 2015/0020822 | A1 | 1/2015 | Janardhan et al. |
| 2015/0163859 | A1 | 6/2015 | Schneider et al. |
| 2015/0245669 | A1 | 9/2015 | Cadieux et al. |
| 2015/0282525 | A1 | 10/2015 | Plojoux et al. |
| 2016/0021934 | A1 | 1/2016 | Cadieux et al. |
| 2016/0081395 | A1 | 3/2016 | Thorens et al. |
| 2016/0286865 | A1 | 10/2016 | King et al. |
| 2016/0309785 | A1 | 10/2016 | Holtz |
| 2016/0353801 | A1 | 12/2016 | Zinovik et al. |
| 2017/0035109 | A1 | 2/2017 | Liu |

FOREIGN PATENT DOCUMENTS

| | | |
|---|---|---|
| EP | 3135135 A1 | 3/2017 |
| JP | 2007-259864 A | 10/2007 |
| RU | 2602053 C2 | 11/2016 |
| WO | WO-2013/102611 A2 | 7/2013 |
| WO | WO-2015/165812 A1 | 11/2015 |
| WO | WO-2016026811 A1 | 2/2016 |
| WO | WO-2016/156509 A1 | 10/2016 |
| WO | WO-2017/011419 A1 | 1/2017 |

OTHER PUBLICATIONS

Chinese Office Action dated Nov. 29, 2021 for corresponding Chinese Application No. 201880012744.1, and English-language translation thereof.
Chinese Office Action dated Jul. 11, 2022 for corresponding Chinese Application No. 201880012744.1, and English-language translation thereof.
Chinese Office Action dated Nov. 9, 2022 for corresponding Chinese Application No. 201880012744.1, and English-language translation thereof.
Japanese Office Action dated May 18, 2022 for corresponding Japanese Application No. 2019-550859, and English-language translation thereof.
http://www.yocanproducts.com/nero-technology-information-vaporizer.php, Nero Technology Traditional Coil Replacement, Yocan Products, Aug. 4, 2016, 1-4.
U.S. Appl. No. 15/095,505, filed Apr. 11, 2016.
U.S. Appl. No. 15/224,608, filed Jul. 31, 2016.
International Search Report and Written Opinion for Application No. PCT/EP2018/056250 dated Jun. 11, 2018.
Written Opinion for corresponding International Application No. PCT/EP2018056250 dated Feb. 15, 2019.
International Preliminary Report on Patentability for correspoding International Application No. PCT/EP2018/056250, dated May 29, 2019.
Russian Office Action and Search Report dated Jul. 5, 2021 for corresponding Russian Application No. 2019130993, and English-language translation thereof.
Notice of Allowance dated Dec. 26, 2023 issued in related Korean patent application No. 10-2019-7024258.
Japanese Notice of Allowance dated Sep. 28, 2022 for corresponding Japanese Application No. 2019-550859, and English-language translation thereof.
Office Action dated Jun. 20, 2023 issued in related Korean patent application No. 2019-7024258.

THREE-PIECE ELECTRONIC VAPING DEVICE WITH PLANAR HEATER

CROSS-REFERENCE TO RELATED APPLICATIONS

This application is a continuation application of U.S. application Ser. No. 15/457,917 filed on Mar. 13, 2017, the entire contents of which are hereby incorporated by reference.

BACKGROUND

Field

The present disclosure relates to an electronic vaping or e-vaping device configured to deliver a pre-vapor formulation to a vaporizer.

Description of Related Art

An electronic vaping device includes a heater element, which vaporizes a pre-vapor formulation to produce a vapor.

SUMMARY

At least one example embodiment relates to a cartridge of an electronic vaping device.

In at least one example embodiment, an electronic vaping device comprises a power supply section, a cartridge, and a heater assembly section. The power supply section includes a power supply. The cartridge includes a reservoir configured to store a pre-vapor formulation, and a wick in fluid communication with the pre-vapor formulation. The heater assembly section is connected to the power supply section and the cartridge. The heater assembly section includes at least one plate heater in physical contact with a portion of the wick. The at least one plate heater is selectively electrically connectable to the power supply.

In at least one example embodiment, the heater assembly section includes a first plate heater and a second plate heater. The first plate heater is arranged at an angle ranging from about at 25° to about 65° to the second plate heater.

In at least one example embodiment, the first plate heater and the second plate heater are electrically connected in series.

In at least one example embodiment, the first plate heater and the second plate heater are electrically connected in parallel.

In at least one example embodiment, the at least one plate heater has a length ranging from about 2.0 mm to about 64.0 mm, a width ranging from about 1.0 mm to about 4.0 mm, and a thickness ranging from about 0.1 mm to about 1.0 mm.

In at least one example embodiment, the at least one plate heater is formed of a platinum alloy. The platinum alloy contains up to about 10% by weight rhodium. In at least one example embodiment, the platinum alloy contains up to about 30% by weight iridium.

In at least one example embodiment, the heater assembly section further comprises: a heater support configured to support the at least one plate heater.

In at least one example embodiment, the heater support has a wedge shape. The wedge shape is formed by a first surface and a second surface. The first surface supports a first plate heater and the second surface supports a second plate heater.

In at least one example embodiment, the heater support includes a base support defining an air channel therethrough.

In at least one example embodiment, the base support includes a side wall. The heater support is ring-shaped and is arranged about a portion of at least a portion of the side wall.

In at least one example embodiment, the plate heater support includes a support ring. The at least one plate heater extends from at least one side of the support ring.

In at least one example embodiment, the at least one plate heater includes two electrical leads extending therefrom. The electrical leads extend from a same side of the at least one plate heater. The electrical leads are attached to the support ring such that the at least one plate heater is cantilevered.

In at least one example embodiment, the at least one plate heater includes four electrical leads extending therefrom. The four electrical leads include two electrical leads extending from opposing sides of the at least one plate heater. Two electrical leads are attached to opposing sides of the support ring.

In at least one example embodiment, the at least one plate heater includes two electrical leads extending therefrom. The electrical leads extend from opposing sides of the at least one plate heater. The electrical leads are attached to opposing sides of the support ring.

In at least one example embodiment, a portion of the wick extends into the heater assembly section when the electronic vaping device is assembled.

In at least one example embodiment, the wick is formed of paper.

In at least one example embodiment, the at least one heater includes three electrical leads.

In at least one example embodiment, the at least one heater include no electrical leads, and the at least one plate heater is electrically connected to the power supply via electrically conductive material.

At least one example embodiment relates to a method of cleaning a plate heater of an electronic vaping device.

In at least one example embodiment, a method of cleaning a plate heater of an electronic vaping device includes removing at least one plate heater from contact with at least one wick of the electronic device, and heating the at least one plate heater to a temperature of about 350° C.

In at least one example embodiment, the at least plate heater is heated for about 10 seconds to about 60 seconds.

In at least one example embodiment, the at least one plate heater is heated for about 30 seconds.

At least one example embodiment relates to a battery assembly section of an electronic vaping device.

In at least one example embodiment, a battery assembly section of an electronic vaping device comprises a first plate heater and a second plate heater arranged at an angle ranging from about at 25° to about 65° to the second plate heater.

In at least one example embodiment, the two plate heaters are electrically connected in series.

In at least one example embodiment, the two plate heaters are electrically connected in parallel.

In at least one example embodiment, the at least two plate heaters each have a length ranging from about 2.0 mm to about 64.0 mm, a width ranging from about 1.0 mm to about 5.0 mm, and a thickness ranging from about 0.1 mm to about 1.0 mm.

In at least one example embodiment, the at least two plate heaters are formed of a platinum alloy.

In at least one example embodiment, the platinum alloy contains up to about 10% by weight rhodium.

In at least one example embodiment, the platinum alloy contains up to about 30% by weight iridium.

In at least one example embodiment, the heater assembly section further comprises a heater support configured to support the at least one plate heater. The heater support includes a base support defining a channel there through. The base support includes a side wall, and a generally conical portion extending from the side wall. The heater support is ring-shaped and is arranged about a portion of the generally conical portion and at least a portion of the side wall.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
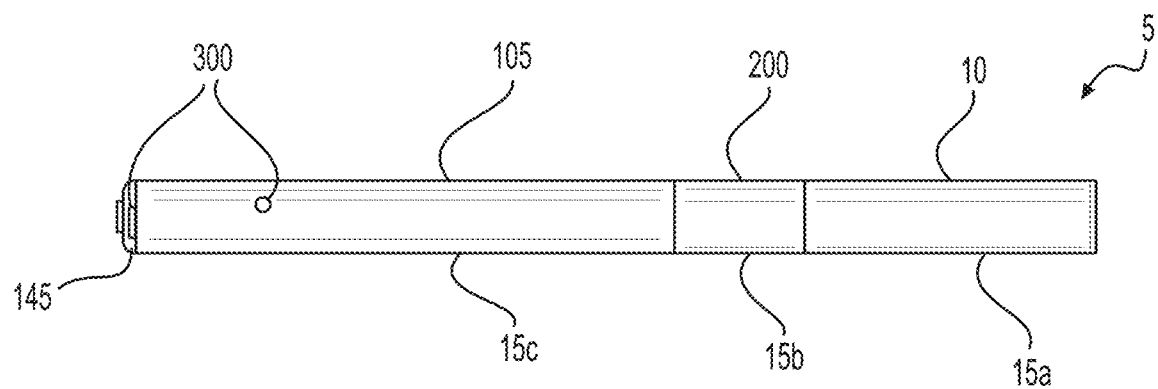
FIG. 1 is a side view of a three-piece electronic vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least one example embodiment relates to a cartridge of an electronic vaping device.

FIG. 1 is a side view of an electronic vaping device according to at least one example embodiment.

In at least one example embodiment, as shown in FIG. 1, an electronic vaping device 5 includes a cartridge 10, a heater assembly section 200, and a power supply section 105. The cartridge 10, the heater assembly section 200, and the power supply section 105 include outer housings 15a, 15b, 15c, respectively.

In at least one example embodiment, at least one air inlet 300 may be located at the power supply end cap 145 and/or along the housing 15c of the power supply section 105. In other example embodiments, the at least one air inlet 300 may be located along the housing 15b of the heater assembly section 200 or along connectors 700 (described below).

In at least one example embodiment, the air inlets 300 may be machined into the housing 140 with precision tooling such that their diameters are closely controlled and replicated from one electronic vaping device 5 to the next during manufacture so as to control a resistance-to-draw of each electronic vaping device 5.

In at least one example embodiment, the electronic vaping device 5 may be about 80 mm to about 200 mm long and about 7 mm to about 15 mm in diameter. For example, in one example embodiment, the electronic vaping device 5 may be about 84 mm long and may have a diameter of about 7.8 mm.

Figure 2:
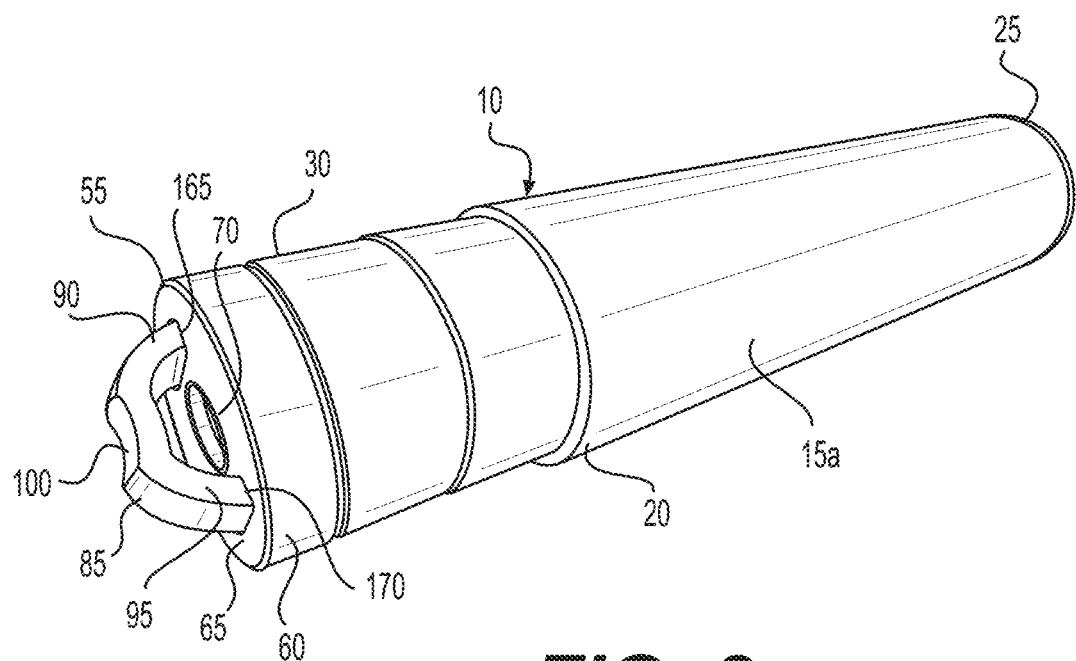
FIG. 2 is a perspective view of a second end of a cartridge including an end cap according to at least one example embodiment.

FIG. 2 is a perspective view from a second end of a cartridge including an end cap according to at least one example embodiment.

In at least one example embodiment, as shown in FIG. 2, a cartridge 10 includes the housing 15a extending in a longitudinal direction and includes the features described in U.S. application Ser. No. 15/095,505, filed Apr. 11, 2016, the entire content of which is incorporated herein by reference thereto In at least one example embodiment, the housing 15a includes a lateral wall 20. The housing 15a has a first end 25 and a second end 30. In at least one example embodiment, the cartridge 10 is a single piece that may be molded and/or 3D printed.

In at least one example embodiment, the housing 15a may have a generally cylindrical cross-section. In other example embodiments, the housing 15a may have a generally triangular cross-section and/or an inner and/or outer diameter of the housing 15a may vary along a length thereof. In some example embodiments, as shown in FIG. 2, the housing 15a may have a greater diameter at the first end 25 than at the second end 30.

In at least one example embodiment, the cartridge 10 also includes an end cap 55. The end cap 55 includes an end cap lateral wall 60 and an end wall 65. The end cap lateral wall 60 is generally cylindrical and has generally a same diameter as a diameter of the second end 30 of the housing 15a.

In at least one example embodiment, the end cap 55 includes at least one inlet 70 therein. The at least one inlet 70 is in communication with an air passage 47 defined by an inner tube 45 (as discussed below with respect to FIG. 3).

In at least one example embodiment, the end cap 55 also includes a first orifice 165 and a second orifice 170 extending through the end cap end wall 65.

Figure 3:
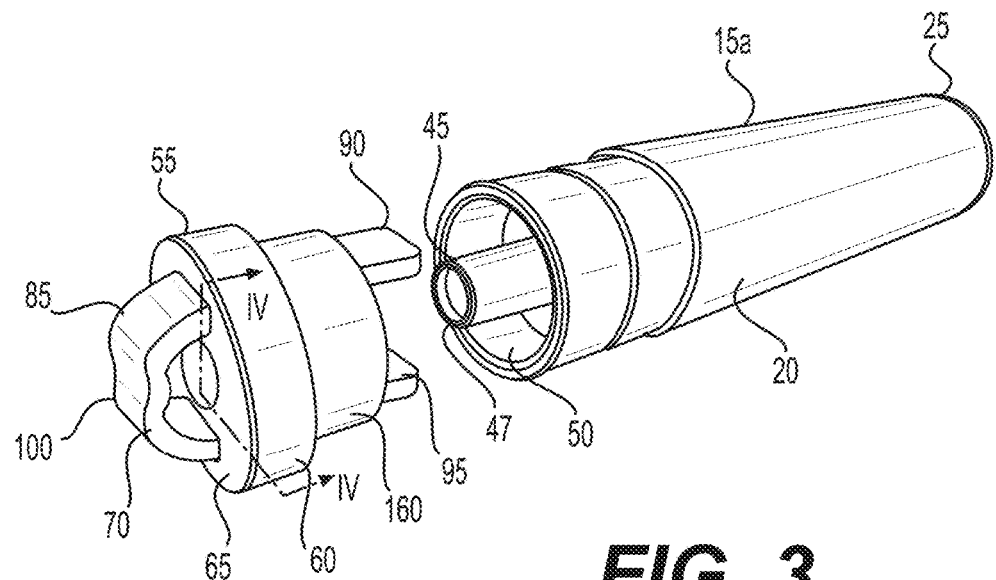
FIG. 3 is an exploded view of an end cap and a cartridge according to at least one example embodiment.

In at least one example embodiment, the cartridge 10 also includes a wick 85. The wick 85 includes a first end 90, a second end 95, and a central portion 100. The first end 90 and the second end 95 extend through first orifice 165 and the second orifice 175 of the end cap 55, respectively. The first end 90 and the second end 95 are configured to contact pre-vapor formulation contained in a reservoir 50 (as shown in FIG. 3 and discussed below). The central portion 100 of the wick 85 extends over the at least one inlet 70. In at least one example embodiment, the wick 85 is formed of at least one of a cellulosic material, a glass material, glass fibers, and cotton.

In at least one example embodiment, the wick is formed of cellulose filter paper having a thickness ranging from about 0.6 mm to about 1.0 mm.

In at least one example embodiment, the wick 85 is a paper wick having a density of about 180 g/m$^3$ to about 190 g/m$^3$. The paper is about 0.80 mm to about 0.85 mm thick. The paper may be 100% cotton, and may have a length of about 5.5 mm and a width of about 3.5 mm.

In at least one example embodiment, the wick 85 may include filaments (or threads) having a capacity to draw the pre-vapor formulation. For example, the wick 85 may be a bundle of glass (or ceramic) filaments, a bundle including a group of windings of glass filaments, etc., all of which arrangements may be capable of drawing pre-vapor formulation via capillary action by interstitial spacings between the filaments. In at least one example embodiment, the wick 85 may include one to eight filament strands, each strand comprising a plurality of glass filaments twisted together. The filaments may have a cross-section that is generally cross-shaped, clover-shaped, Y-shaped, or in any other suitable shape.

In at least one example embodiment, the wick 85 may include any suitable material or combination of materials. Examples of suitable materials may be, but not limited to, glass, ceramic- or graphite-based materials. The wick 85 may have any suitable capillarity drawing action to accommodate pre-vapor formulations having different physical properties such as density, viscosity, surface tension and vapor pressure.

In at least one example embodiment, the wick 85 is generally U-shaped.

In at least one example embodiment, the housing 15a and end cap 55 are formed of plastic. The housing 15a and end cap 55 may be injection molded or 3D printed. The plastic may be clear, tinted, and/or colored plastics.

In at least one example embodiment, the end cap 55 is formed of polyetheretherketone (PEEK). In other example embodiments, the end cap 55 may be formed of stainless steel or moldable plastics, such as high density polypropylene.

FIG. 3 is an exploded view of an end cap and a cartridge according to at least one example embodiment.

In at least one example embodiment, the cartridge is the same as in FIG. 2, but is shown in an exploded view to illustrate additional portions of the end cap 55. As shown in FIG. 3, the end cap lateral wall 60 includes a portion 160 (shown in FIG. 2) having a smaller outer diameter than an inner diameter of the housing 15a at the second end 30. Thus, a portion of the end cap lateral wall 60 may be received within the second end 30 of the housing 15a. The portion 160 of the end cap lateral wall 60 may be held in place within the second end 30 of the housing 15a by friction fit, snap fit, or any other suitable connection. For example, an adhesive may be used to hold the portion 160 of the end cap lateral wall 60 in the housing 15a. Alternatively, the portion 160 of the end cap lateral wall 60 and the second end 30 of the housing 15a may include threaded portions that provide a threaded connection between the end cap 55 and the housing 15a.

In at least one example embodiment, as shown in FIG. 3, the inner tube 45 is integrally formed with the housing 15a and is coaxially positioned within the housing 15a. The reservoir 50 is defined between an outer surface of the inner tube 45 and an inner surface of the housing 15a. The reservoir 50 is sized and configured to contain a pre-vapor formulation.

In at least one example embodiment, the inner tube 45 extends in the longitudinal direction. The inner tube 45 communicates with at least one outlet 40 (shown in FIG. 5).

In at least one example embodiment, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

In at least one example embodiment, the cartridge 10 may be replaceable. In other words, once the pre-vapor formulation of the cartridge 10 is depleted, the cartridge 10 may be discarded and replaced with a new cartridge. In another example embodiment, the reservoir 50 in the cartridge 10 may be refilled, such that the cartridge 10 is reusable.

In at least one example embodiment, the reservoir 50 may optionally contain a storage medium (not shown). The storage medium is configured to store the pre-vapor formulation therein. The storage medium 210 may include a winding of cotton gauze or other fibrous material.

In at least one example embodiment, the storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape.

Figure 4:
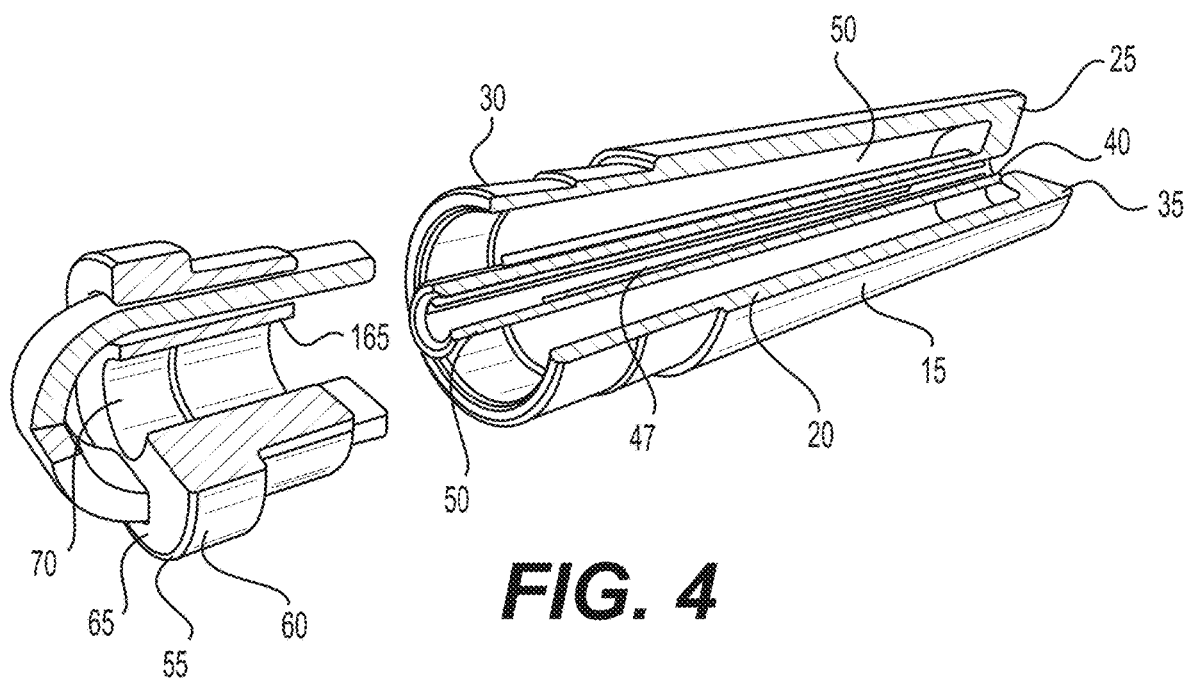
FIG. 4 is an exploded, cross-sectional view of the cartridge of FIG. 2 along line IV-IV according to at least one example embodiment.

FIG. 4 is an exploded, cross-sectional view of the cartridge of FIG. 3 along line IV-IV according to at least one example embodiment.

In at least one example embodiment, as shown in FIG. 4, the cartridge 10 is the same as shown in FIGS. 2 and 3, but the housing 15a is shown with a transverse end wall 35 at the first end 25 of the housing 15a. The transverse end wall 35 is integrally formed with the lateral wall 20 and the inner tube 45. The transverse end wall 35 includes at least one outlet 40 therein. The at least one outlet 40 is in communication with an air passage 47 defined by the inner tube 45.

Figure 5:
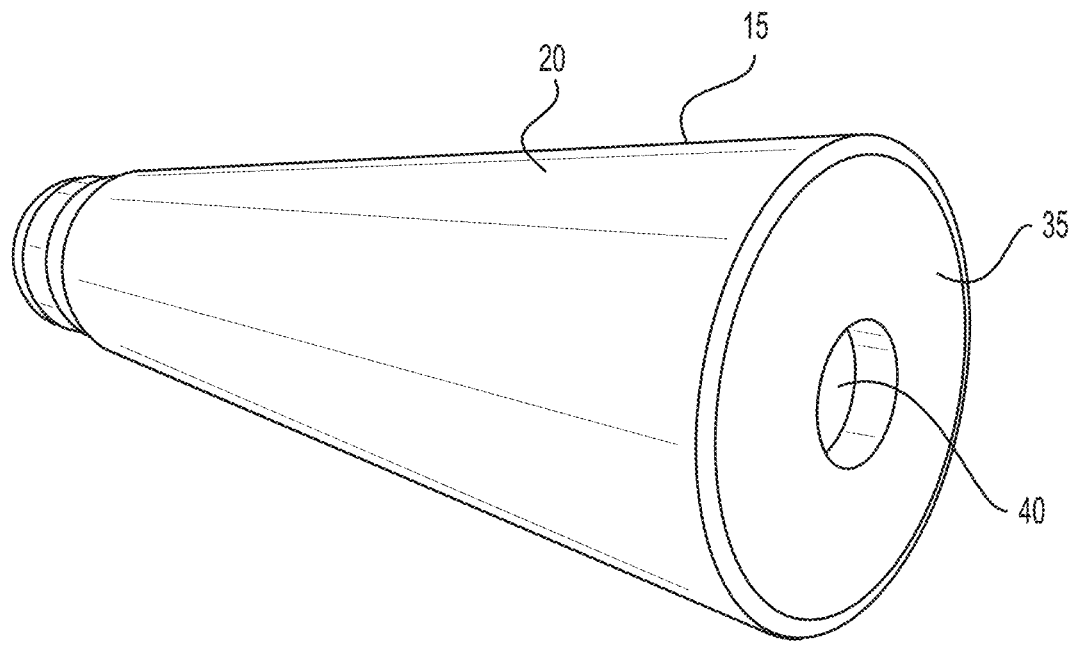
FIG. 5 is a perspective view of a first end of a cartridge according to at least one example embodiment.

FIG. 5 is a perspective view of another end of the cartridge according to at least one example embodiment.

In at least one example embodiment, as shown in FIG. 5, the cartridge 10 is the same as in FIGS. 2, 3, and 4, but the transverse end wall 35 is shown with a generally planar surface having the at least one outlet 40 therein. In other example embodiments, the transverse end wall 35 may be convex or concave.

Figure 6:
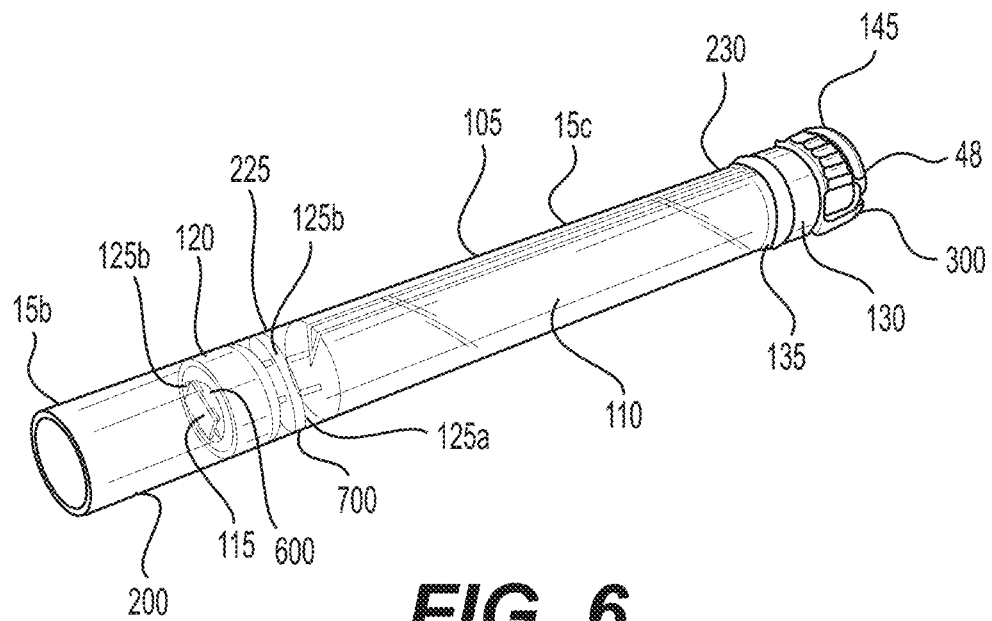
FIG. 6 is a perspective view of a heater assembly section joined with a power supply section according to at least one example embodiment, the housings of which are transparent.

FIG. 6 is a perspective view of a power supply section and a heater assembly section according to at least one example embodiment, the housings of which are illustrated as transparent to show the inner portions of the power supply section and the heater assembly section.

In at least one example embodiment, as shown in FIG. 6, the power supply section 105 includes a housing 15c extending in a longitudinal direction. The housing 15c is shown transparent for purposes of illustration only. The housing 15c has a first housing end 225 and a second housing end 230. The first housing end 225 is configured to connect with the heater assembly section 200.

In at least one example embodiment, the power supply section 105 and the heater assembly section 200 may connect via a connector 700. The connector 700 may be a threaded connector, snap-fit connector, friction fit connector, and/or any other suitable connector. The connector 700 may be at least partially formed of an electrically conductive material as described in U.S. application Ser. No. 15/224,608, filed Jul. 31, 2016, the entire content of which is incorporated herein by reference thereto. Because the connector 700 does not contact the cartridge 10, there is no physical contact between the connector 700 and the reservoir and/or pre-vapor formulation contained therein.

In at least one example embodiment, the power supply section 105 includes a battery 110.

In at least one example embodiment, the heater assembly section 200 includes the housing 15b that contains a support 120 configured to support the heater 115 thereon.

In at least one example embodiment, the heater 115 may be a planar heater, such as a plate heater as described herein. The support 120 may be generally cylindrical and/or ring-shaped. The support 120 defines an air flow channel 600 there through. The heater 115 is suspended across the support 120 and supported thereon by leads 125a, 125b. The leads 125a, 125b extend through the support 120 and to (or through) the connector 700. The connector 700 may be formed of an electrically conductive material and includes at least one air passage there through.

In at least one example embodiment, the heater 115 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heater 115 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heater 115 may include at least one material selected from the group consisting of stainless steel, copper, copper alloys, nickel-chromium alloys, super alloys and combinations thereof. In an example embodiment, the heater 115 may be formed of nickel-chromium alloys or iron-chromium alloys. In another example embodiment, the heater 115 may include a layer of a ceramic or alumina having an electrically resistive layer on an outside surface thereof, such as a layer of platinum. In at least one example embodiment, the heater 115 may include at least one of ceramic, alumina, or zirconia. In at least one example embodiment, the heater 115 is formed of platinum-alumina or platinum-zirconia, and the heaters may have dimensions of about 1.6 mm by about 3.5 mm by about 0.25 mm.

In at least one example embodiment, the heater 115 is formed of a platinum alloy. The platinum alloy may contain up to about 10% by weight rhodium. The platinum alloy may contain up to about 30% by weight iridium. Such alloys may have a lower temperature coefficient of resistance, such that the heater will not increase in resistance as much as unalloyed platinum heaters. This allows for a larger initial resistance resulting in lower initial current. The lower current allows for a greater range of batteries and power circuits to be used with the heater.

In at least one example embodiment, the heater assembly section 200 includes two or more heaters 115 that are electrically connected in parallel or in series. When connected in parallel, the overall starting resistance may be about 0.86 ohms, whereas when connected in series, the overall starting resistance is increased so as to require lower starting current for heater operation.

In at least one example embodiment, the heater 115 has a length ranging from about 2.0 mm to about 64.0 mm, a width ranging from about 1.0 mm to about 4.0 mm, and a thickness ranging from about 0.1 mm to about 1.0 mm.

The at least two electrical leads 125a, 125b may extend from the heater 115 and electrically connect the heater 115 to the battery 110. The electrical leads 125a, 125b may be formed of nickel or stainless steel. The heater 115 may have an electrical resistance of about 2.6 ohms at 25° C. and an electrical resistance of about 5.6 ohms at 350° C. The leads 125a 125b may be about 10 mm long and can support up a temperature of up to about 400° C.

In at least one example embodiment, the heater 115 has a width and/or length that is less than a width and/or length of the wick 85 at a point where the heater 115 contacts the wick 85. Thus, when the heater 115 contacts the wick 85, a surface of the heater 115 fully contacts the wick 85 and a portion of the wick 85 extends beyond borders of the heater 115. The heater 115 may heat pre-vapor formulation in the wick 85 by thermal conduction. Alternatively, heat from the heater 115 may be conducted to the pre-vapor formulation by means of a heat conductive element or the heater 115 may transfer heat to the incoming ambient air that is drawn through the electronic vaping device 5 during vaping, which in turn heats the pre-vapor formulation by convection.

In at least one example embodiment, the battery 110 may be a Lithium-ion battery or one of its variants, for example a Lithium-ion polymer battery. Alternatively, the battery 110 may be a nickel-metal hydride battery, a nickel cadmium battery, a lithium-manganese battery, a lithium-cobalt battery or a fuel cell.

In at least one example embodiment, the battery 110 may be rechargeable and may include circuitry configured to allow the battery 110 to be chargeable by an external charging device.

In at least one example embodiment, the power supply section 105 may also include a control circuit 135 and a sensor 130.

In at least one example embodiment, the sensor 130 is configured to generate an output indicative of a magnitude and direction of airflow in the electronic vaping device 5.

The control circuit 135 receives the output of the sensor 130, and determines if (1) the direction of the airflow indicates a draw on the outlet 40 (versus blowing) and (2) the magnitude of the draw exceeds a threshold level. If these vaping conditions are met, the control circuit 135 electrically connects the power supply 110 to the heating element 115; thus, activating the heating element 115S. Namely, the control circuit 135 electrically connects the first and second leads 125a, 125b (e.g., by activating a heater power control transistor forming part of the control circuit 135) such that the heating element 115 becomes electrically connected to the power supply 110. In an alternative embodiment, the sensor 130 may indicate a pressure drop, and the control circuit 135 activates the heating element 115 in response thereto.

In at least one example embodiment, the power supply section 105 may include a light 48 in and/or adjacent the end cap 145 of the power supply section 105. The control circuit 135 may be configured to initiate lighting of the light 48 when the heater 115 is activated. The light 48 may include one or more a light-emitting diodes (LEDs). The LEDs may include one or more colors (e.g., white, yellow, red, green, blue, etc.). Moreover, the heater activation light 48 may be arranged to be visible to an adult vaper. In addition, the light 48 may be utilized for e-vaping system diagnostics or to indicate that recharging is in progress. The light 48 may also be configured such that the adult vaper may activate and/or deactivate the heater activation light 48 for privacy.

In at least one example embodiment, the control circuit 135 may include a time-period limiter. In another example embodiment, the control circuit 135 may include a manually operable switch for an adult vaper to initiate heating. The time-period of the electric current supply to the heating element 115 may be set or pre-set depending on the amount of pre-vapor formulation desired to be vaporized.

In at least one example embodiment, the at least one air inlet 300 may be located adjacent the power supply end cap 145. The at least one air inlet 300 may extend through the housing 15c. In other example embodiments, the at least one air inlet 300 may extend through a portion of the housing 15b of the heater assembly section 200.

Next, operation of the e-vaping device 5 to create a vapor will be described. For example, air is drawn primarily into the cartridge 10 through the at least one air inlet 300 in response to a draw on the outlet 40. The air passes through the air inlet 300, into the space surrounding the battery, through an air passage in the connector, through the support 120 in the heater assembly section 200, into the air passage 47 in the cartridge 10 and through the outlet 40 of the cartridge 10. If the control circuit 135 detects the vaping conditions discussed above, the control circuit 135 initiates power supply to the heating element 115, such that the heating element 115 heats pre-vapor formulation in the wick 85.

When activated, the heating element 115 may heat a portion of the wick 85 for less than about 10 seconds.

Figure 7:
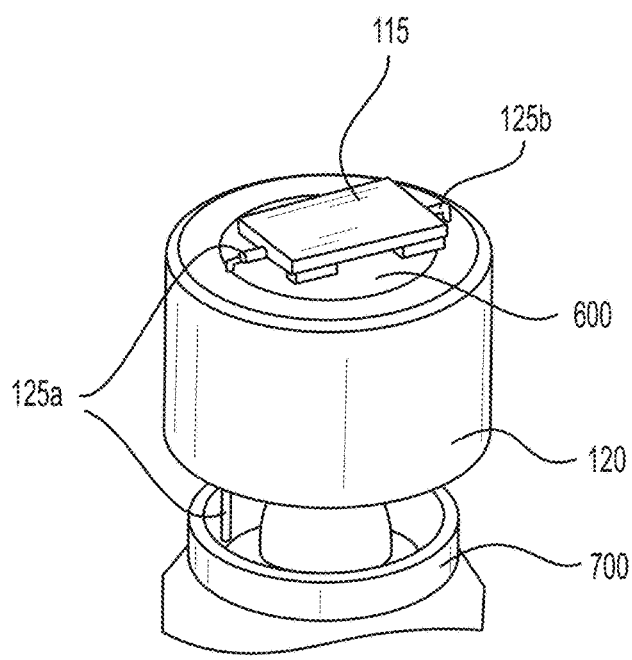
FIG. 7 is an enlarged, perspective view of a portion of the heater assembly section of FIG. 6 according to at least one example embodiment.

FIG. 7 is an enlarged, perspective view of a heater assembly according to at least one example embodiment.

In at least one example embodiment, as shown in FIG. 7, as described with respect to FIG. 6, the leads 125a, 125b are supported by the support 120, such that the heater 115 is suspended across the air channel 600 that extends through the support 120. The leads 125a, 125b may extend through holes in the support 120. The leads 125a, 125b may be arranged such that no portion of the heater 115 contacts the support 120. In other example embodiments, portions of the heater 115 directly contact the support 120.

The support 120 may be formed of MACOR material, which is a machineable glass-ceramic available from Corning, Inc.

Figure 8:
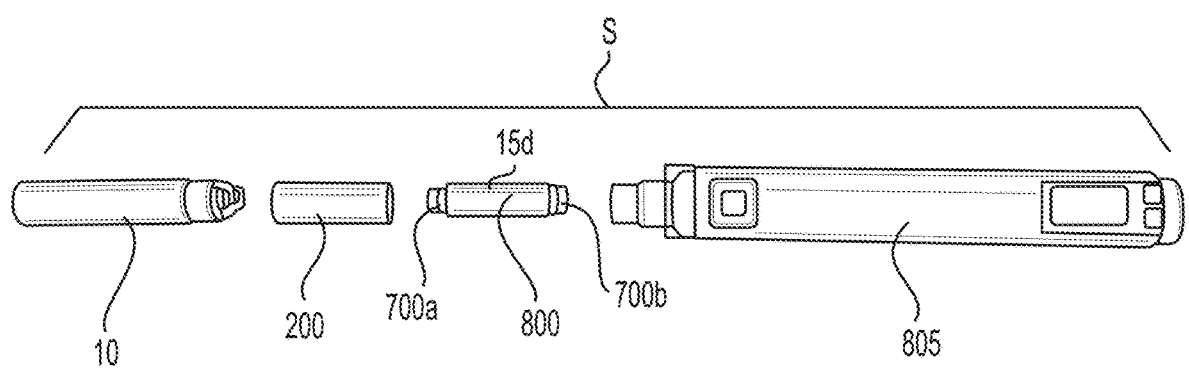
FIG. 8 is an exploded view of a four-piece electronic vaping device according to at least one example embodiment.

FIG. 8 is an exploded view of a four-piece electronic vaping device according to at least one example embodiment.

In at least one example embodiment, as shown in FIG. 8, the cartridge 10 and heater assembly section 200 are the same as in FIGS. 1-7, except the electronic vaping device 5 includes an adapter 800 and a commercially available battery section 805 instead of the power supply section described above. The adapter 800 may include a housing 15d, a first connector 700a, and a second connector 700b. The first connector 700a connects the adapter to the heater assembly section 200, while the second connector 700b connects the heater assembly section 200 to the battery section 805. The batter section may be any off the shelf battery section, such as the iTaste VV V3.0 battery section available from Innokin® Technology. Such battery sections may supply power to the heater 115 until pressing a pushbutton actuator.

Use of the cartridge, heater assembly section, and adapter may allow for use of a battery section including a larger battery so as to prolong battery life between charging.

Figure 9A:
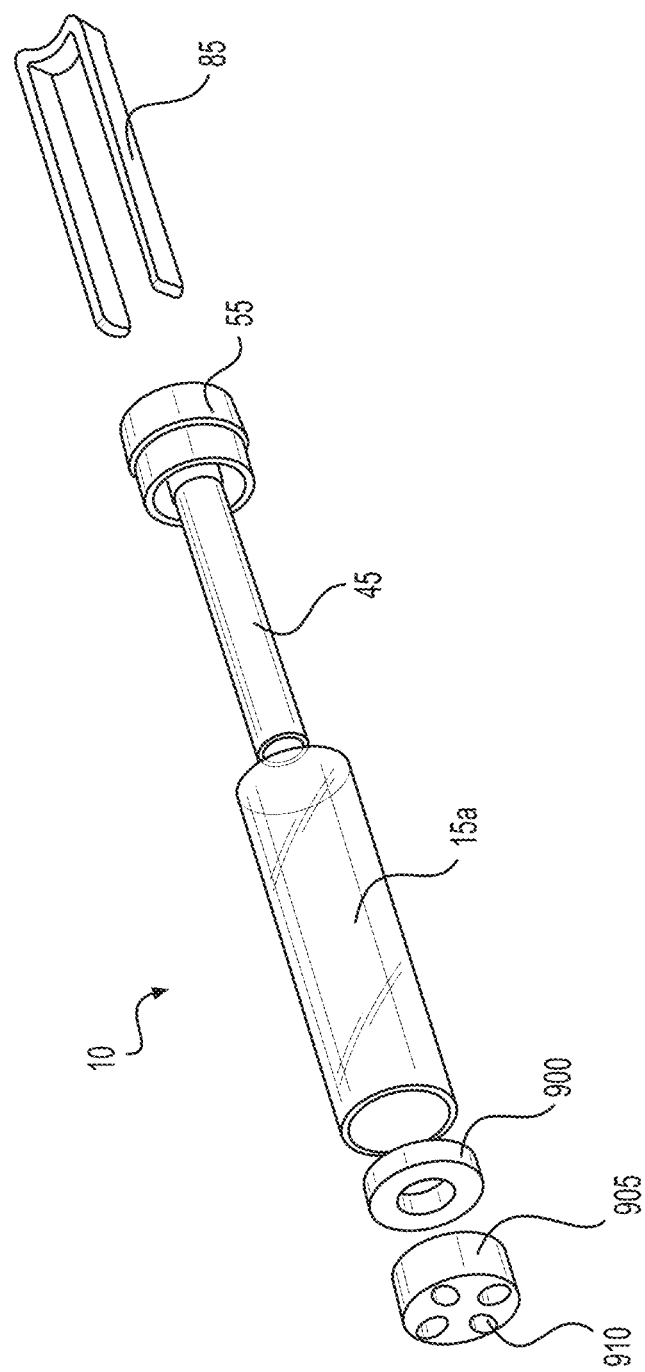
FIGS. 9A and 9B are exploded views of a cartridge for an electronic vaping device according to at least one example embodiment.
Figure 9B:
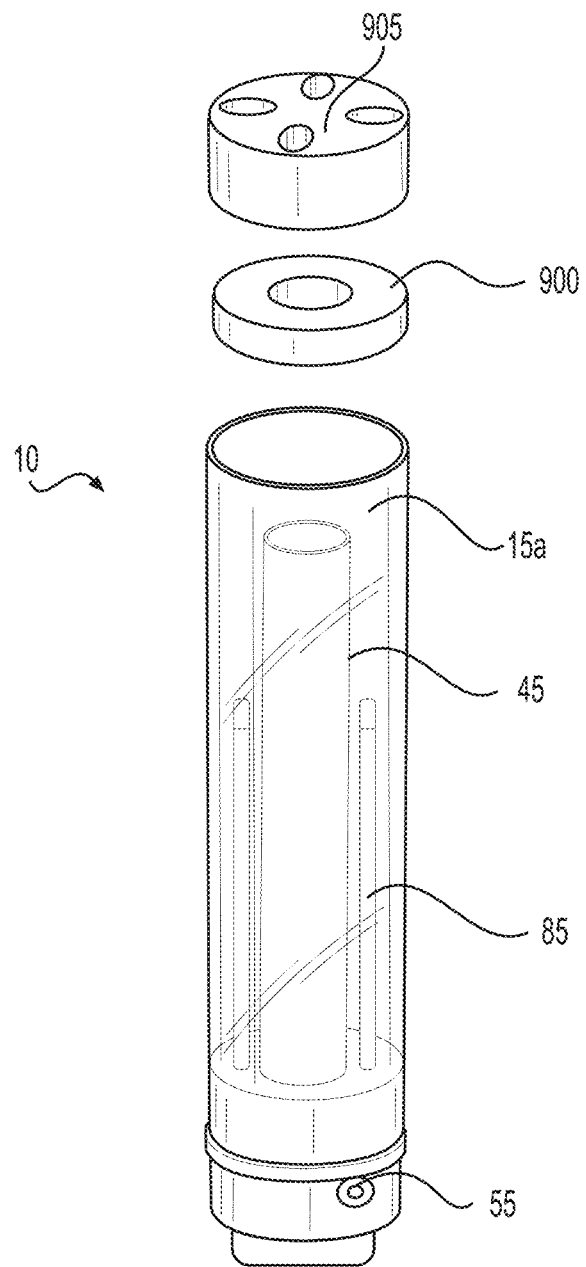

FIGS. 9A and 9B are exploded views of a cartridge for an electronic vaping device according to at least one example embodiment.

In at least one example embodiment, as shown in FIGS. 9A and 9B, the cartridge 10 is the same as in FIGS. 1-5 except that the inner tube 45 is integrally formed with the end cap 55 instead of the housing 15a, and the cartridge includes a gasket 900 and a mouth-end insert 905 including a plurality of outlets 910. The gasket 900, the mouth-end insert 905, and the outlets 910 may be the same as those described in U.S. Pat. No. 9,282,772 to Tucker et al., issued Mar. 15, 2016, the entire content of which is incorporated herein by reference thereto.

FIGS. 10A, 10B, 10C, and 10D are illustrations of a heating assembly for an electronic vaping device according to at least one example embodiment.

In at least one example embodiment, the heater assembly section 200 is the same as in FIGS. 1, 6, and 8, except that the heater assembly section 200 includes two plate heaters 115 and a support ring 123. The support ring 123 surrounds at least a portion of the support 120.

In at least one example embodiment, the support ring 123 is formed of PEEK or Polyethylene Terephthalate Glycol (PETG).

Figure 10A:
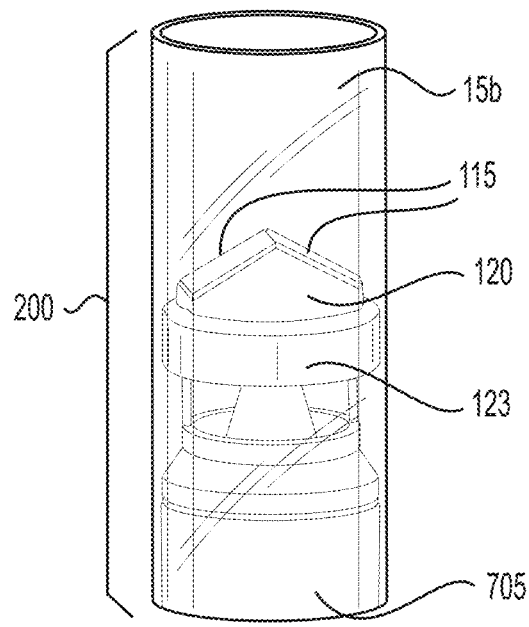
FIGS. 10A, 10B, 10C, and 10D are illustrations of a heating assembly for an electronic vaping device according to at least one example embodiment.

In at least one example embodiment, as shown in FIG. 10A, the cartridge 200 includes the housing 15b, which is shown as transparent for illustration purposes only. The heater support 120 supports the two heater plates 115. The support ring 123 surrounds at least a portion of the support 120. Two leads 125a, 125b extend from each heater plate 115. The leads 125a, 125b are between the support 120 and the ring 123. One lead 125a from each heater 115 contacts a conductive post 715 to battery, while the second lead 125b from each heater 115 contacts the conductive connector body 705.

Figure 10B:
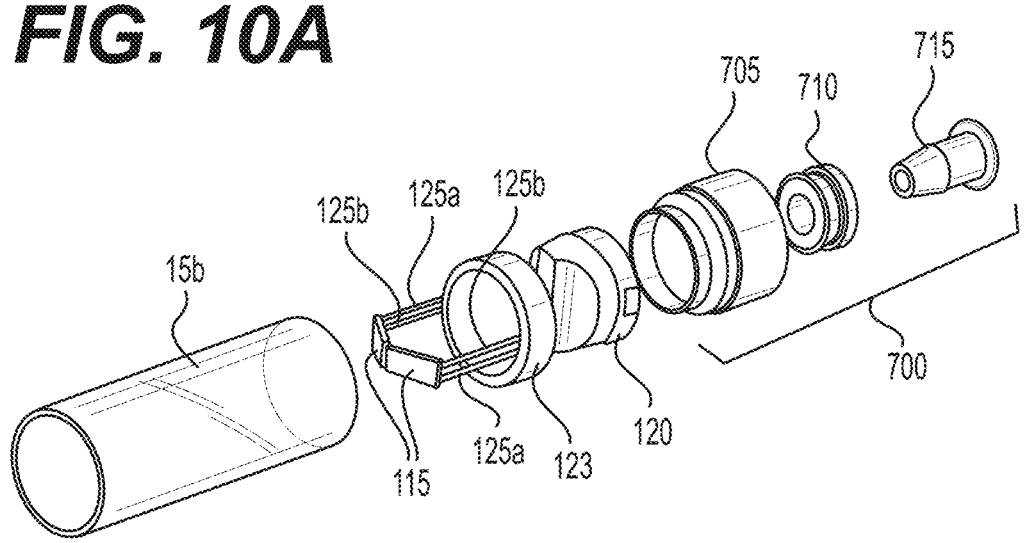

In at least one example embodiment, as shown in FIG. 10B, an insulating shell 710 insulates the connector body 705 from the conductive post 715.

In at least one example embodiment, the first plate heater is arranged at an angle ranging from about at 25° to about 65° to the second plate heater. For example, the first plate heater may be arranged at an angle of about 45° to the second plate heater.

In at least one example embodiment, each plate heater has a length ranging from about 2.0 mm to about 64.0 mm, a width ranging from about 1.0 mm to about 4.0 mm, and a thickness ranging from about 0.1 mm to about 1.0 mm.

The two plate heaters 115 are electrically connected in parallel or in series. As set forth above, when connected in parallel, the overall starting resistance may be about 0.86 ohms, whereas when connected in series, the overall starting resistance is increased so as to require lower starting current for heater operation.

Figure 10C:
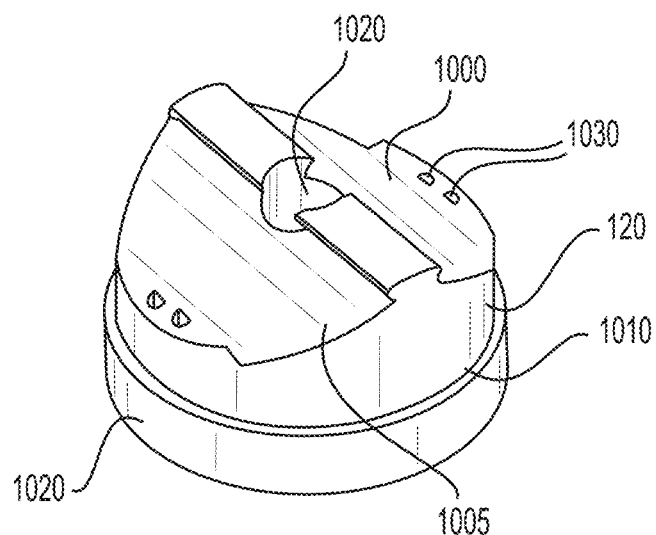
Figure 10D:
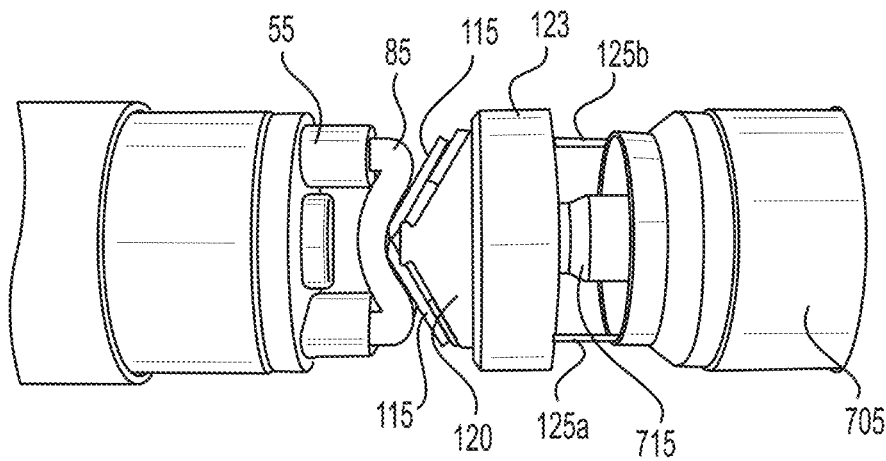

In at least one example embodiment, as shown in FIG. 10C, the support 120 has a generally wedge shape. The wedge shape is formed by a first surface 1000 and a second surface 1005. The first surface 1000 supports a first plate heater and the second surface supports a second plate heater as shown in FIG. 10D (below). The first surface 1000 may be angled with respect to the second surface 1005 at an angle that is about the same as a desired angle of the first heater to the second heater.

In at least one example embodiment, the heater support 120 includes a base 1010 defining an air channel 1020 therethrough. The air channel 1020 extends between the first surface 1000 and the second surface 1005. Thus, air may flow in through the at least one air inlet 300 (described above with respect to FIG. 6) and through the air channel 1020 in the support 120 towards the heaters 115.

In at least one example embodiment, the base 1010 includes a lateral wall 1020.

In at least one example embodiment, a plurality of holes 1030 may be defined through the base 1010. The leads 125a, 125b from the heaters 115 extend through the holes 1030 in the base 1010 and to the connector 700.

In at least one example embodiment, as shown in FIG. 10D, the angle of the heaters 115 is such that the heaters 115 press into the central portion of the wick 85 when the cartridge 10 is joined with the heater assembly section 200. Accordingly, contact between the heaters 115 and the wick 85 is enhanced so as to provide increased vapor mass.

Figure 11A:
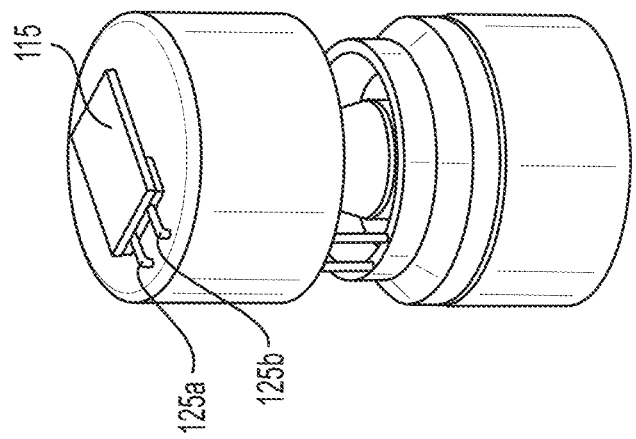
FIGS. 11A and 11B are illustrations of a heating assembly for an electronic vaping device according to at least one example embodiment.
Figure 11B:
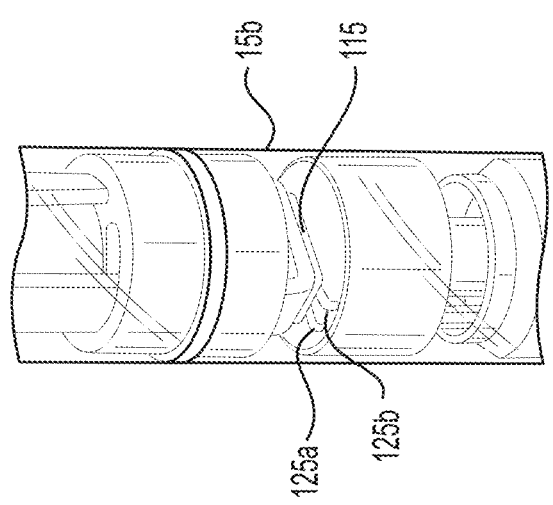

FIGS. 11A and 11B are illustrations of a heating assembly for an electronic vaping device according to at least one example embodiment.

In at least one example embodiment, as shown in FIG. 11A, the heater 115 is the same as in FIG. 7, except that the leads 125a, 125b are on the same side of the heater 115. Thus, the heater 115 is cantilevered over the opening in the support 120. Since part of the heater 115 is supported by the support 120, the heater 115 is not bent when placed in contact with the wick 85. Moreover, the temperature of the heater 115 is hottest at the end extending over the channel 600 in the support 120.

The heater 115 may be larger than the heater 115 in embodiments including two or more heaters 115.

Figure 12:
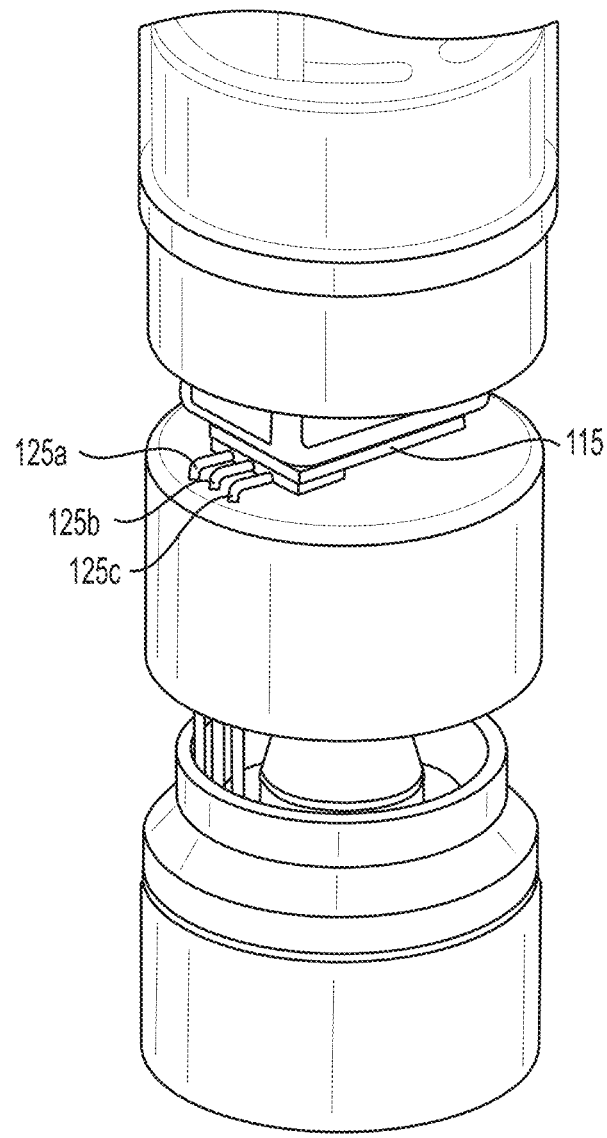
FIG. 12 is an illustration of a heating assembly according to at least one example embodiment.

FIG. 12 is an illustration of a heating assembly according to at least one example embodiment.

In at least one example embodiment, as shown in FIG. 12, the heater 115 is the same as in FIGS. 11A and 11B, but includes a third electrical lead 125c. The three leads 125a, 125b, 125c extend from a same side of the heater 115, but could extend from different sides.

Figure 13A:
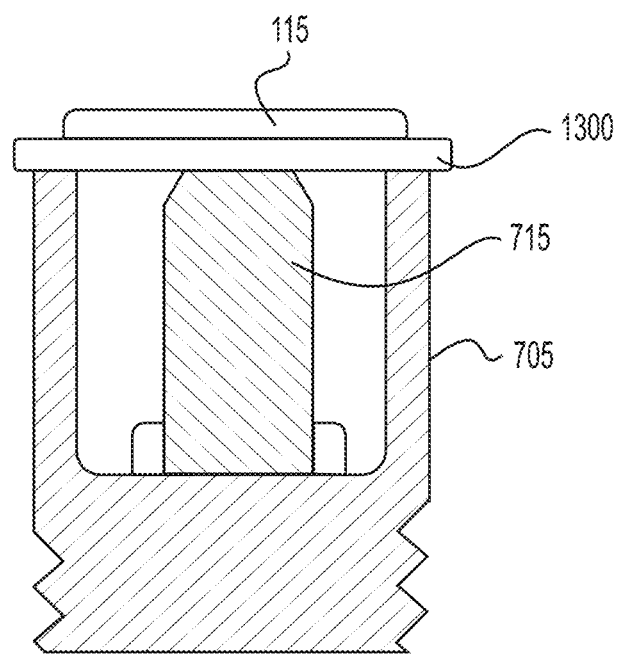
FIGS. 13A and 13B are illustrations of a heating assembly according to at least one example embodiment.
Figure 13B:
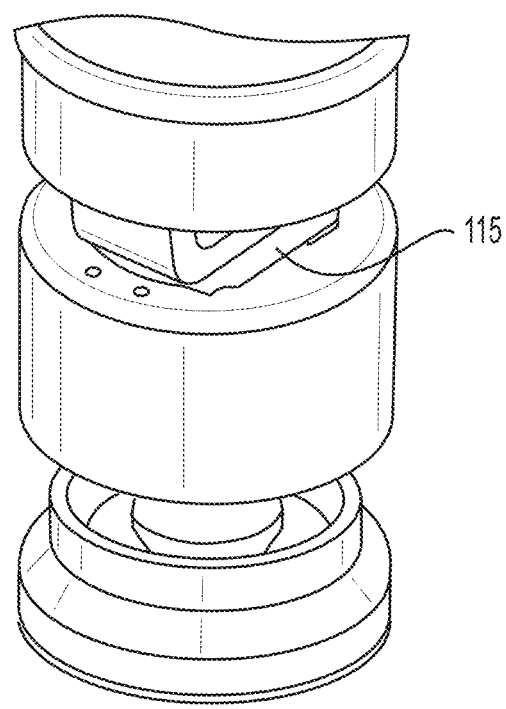

FIGS. 13A and 13B are illustrations of a heating assembly according to at least one example embodiment.

In at least one example embodiment, as shown in FIGS. 13A and 13B, the at least one plate heater 115 may include no electrical leads, but may be affixed to a sheet of metal 1300 and/or in contact with conductive portions of the connector. Heat is transferred to the metal sheet, then to the heater, both of which may form vapor during heating. In this embodiment, different portions of the heater 115 may contact the conductive post 715 and the conductive connector body 705, which is electrically isolated from the conductive post 715 so that power/current flows directly to the heater 115.

Figure 14:
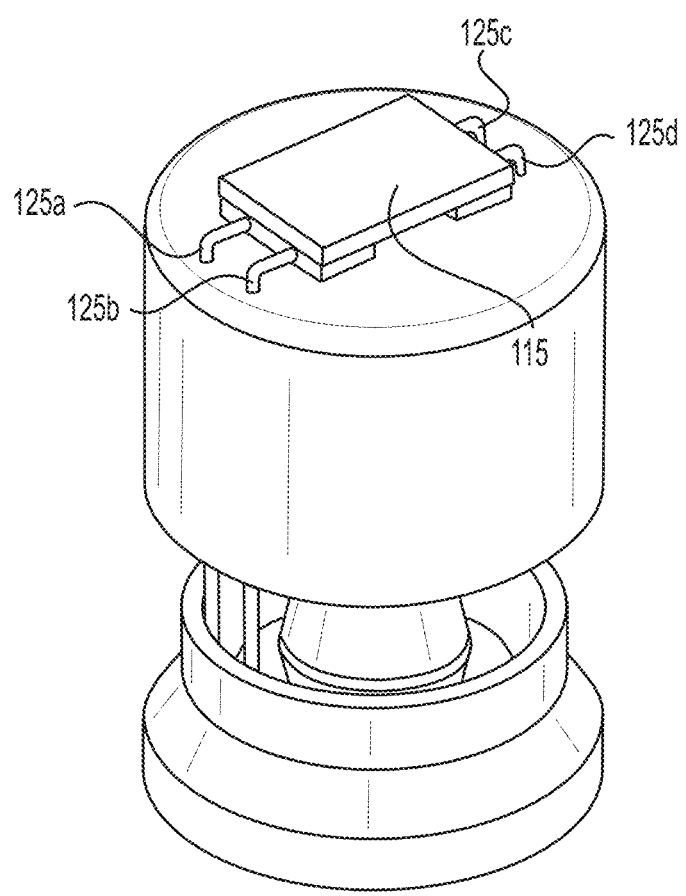
FIG. 14 is an illustration of a heating assembly according to at least one example embodiment.

In at least one example embodiment, as shown in FIG. 14, the plate heater 115 includes four electrical leads 125*a*, 125*b*, 125*c*, 125*d*. Two electrical leads may extend from one side of the plate heater 115, while two other electrical leads extend from another side of the plate heater 115.

In other example embodiments, the electrical leads 125*a*, 125*b*, 125*c*, 125*d* may all extend from a same side of the plate heater 115, one leads may extend from each side of the plate heater, or three leads may extend from one side and one lead from another side of the plate heater 115 (not shown).

At least one example embodiment relates to a method of cleaning a plate heater of an electronic vaping device.

In at least one example embodiment, a method of cleaning a plate heater of an electronic vaping device includes removing the at least one plate heater from contact with at least one wick of the electronic device, and heating the at least one plate heater to a temperature of about 350° C. The heating causes residue to burn off the heater, so as to clean the heater.

In at least one example embodiment, the at least plate heater is heated for about 10 seconds to about 60 seconds. In at least one example embodiment, the at least one plate heater is heated for about 30 seconds.

Because the cartridge 10 is separate from the heater assembly section, the reservoir of the electronic vaping device 5 may be larger than in commercially available electronic vaping devices, so that a larger quantity of the pre-vapor formulation may be stored in the vaping device 5. Moreover, the heater 115 is resuable, and only the cartridge 10 may be disposable so as to reduce waste and/or cost.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A heater assembly section comprising:
a first plate heater;
a second plate heater arranged at an angle ranging from 25° to 65° to the first plate heater; and
a heater support configured to support the first plate heater and the second plate heater, the heater support including,
a base support including,
a side wall, and
a conical portion extending from the side wall, the conical portion defining a channel extending through a center thereof, and
a ring-shaped arranged about a portion of the conical portion and at least a portion of the side wall.

2. The heater assembly section of claim 1, wherein the two plate heaters are electrically connected in series.

3. The heater assembly section of claim 1, wherein the first plate heater and the second plate heater are electrically connected in parallel.

4. The heater assembly section of claim 1, wherein the first plate heater and the second plate heater each have a length ranging from 2.0 mm to 64.0 mm, a width ranging from 1.0 mm to 5.0 mm, and a thickness ranging from 0.1 mm to 1.0 mm.

5. The heater assembly section of claim 1, wherein the first plate heater and the second plate heater are formed of a platinum alloy.

6. The heater assembly section of claim 5, wherein the platinum alloy contains up to 10% by weight rhodium.

7. The heater assembly section of claim 5, wherein the platinum alloy contains up to about 30% by weight iridium.

8. The heater assembly section of claim 1, wherein the heater support is formed of a glass-ceramic material.

9. The heater assembly section of claim 1, wherein the angle is 45°.

10. An electronic vaping device comprising:
a cartridge;
the heater assembly section of claim 1; and
a power supply section.

* * * * *